United States Patent [19]
Tsai et al.

[11] Patent Number: 6,021,948
[45] Date of Patent: Feb. 8, 2000

[54] HYBRID CARD READERS FOR IC CARDS/ MAGNETIC CARDS

[75] Inventors: Wu Jung Tsai; Kan Lin Chou, both of Tainan; Shen Yuan Chien, Taipei, all of Taiwan

[73] Assignees: Industrial Technology Research Institute, Hsinchu; Alston Development Co., Ltd., Tainan, both of Taiwan

[21] Appl. No.: 09/113,354

[22] Filed: Jul. 10, 1998

[30] Foreign Application Priority Data

May 5, 1998 [TW] Taiwan ................................. 87206902

[51] Int. Cl.[7] ........................................................ G06K 7/00
[52] U.S. Cl. ............................ 235/486; 235/440; 361/737
[58] Field of Search ...................... 235/486, 492, 235/493, 477, 478, 483, 485, 440, 449, 451; 902/26, 27; 361/737

[56] References Cited

U.S. PATENT DOCUMENTS

| | | | |
|---|---|---|---|
| 3,653,323 | 4/1972 | McGowan et al. | 235/486 X |
| 4,152,584 | 5/1979 | Sato | 235/486 X |
| 4,680,807 | 7/1987 | Stockburger et al. | 235/380 X |
| 4,810,863 | 3/1989 | Kachi et al | 235/441 |
| 4,929,821 | 5/1990 | Kocznar et al. | 235/493 |
| 5,331,144 | 7/1994 | Shima et al. | 235/486 |
| 5,332,890 | 7/1994 | Kitahara | 235/440 |
| 5,463,210 | 10/1995 | Imura | 235/441 |

FOREIGN PATENT DOCUMENTS 0-357-827  3/1990  European Pat. Off. .

*Primary Examiner*—Michael G Lee
*Attorney, Agent, or Firm*—Bacon & Thomas, PLLC

[57] ABSTRACT

A hybrid card reader for IC cards/magnetic cards includes a casing consisting of an upper casing and a lower casing defining a card passage therebetween. A reduction gear train is mounted on the upper casing and driven by a motor mounted in the casing for driving a roller. Two parallel walls are mounted on the lower casing and include aligned slots defined therein. An idle wheel is mounted to face the roller to sandwich a card therebetween. A fixing member is swivelably mounted to the casing for supporting a magnetic head. A frame is slidably guided by the slots of the parallel walls for contacting with an IC on the card. The idle wheel contacts with the roller under the action of a spring wire when the card is not inserted into the card passage. When the card is inserted into the card passage, the card is sandwiched between the idle wheel and the roller and conveyed under rolling friction upon rotation of the roller. When an interruption of service occurs or the card reader malfunctions, the card can be quickly removed from the card reader and returned to the owner under manual operation.

13 Claims, 6 Drawing Sheets

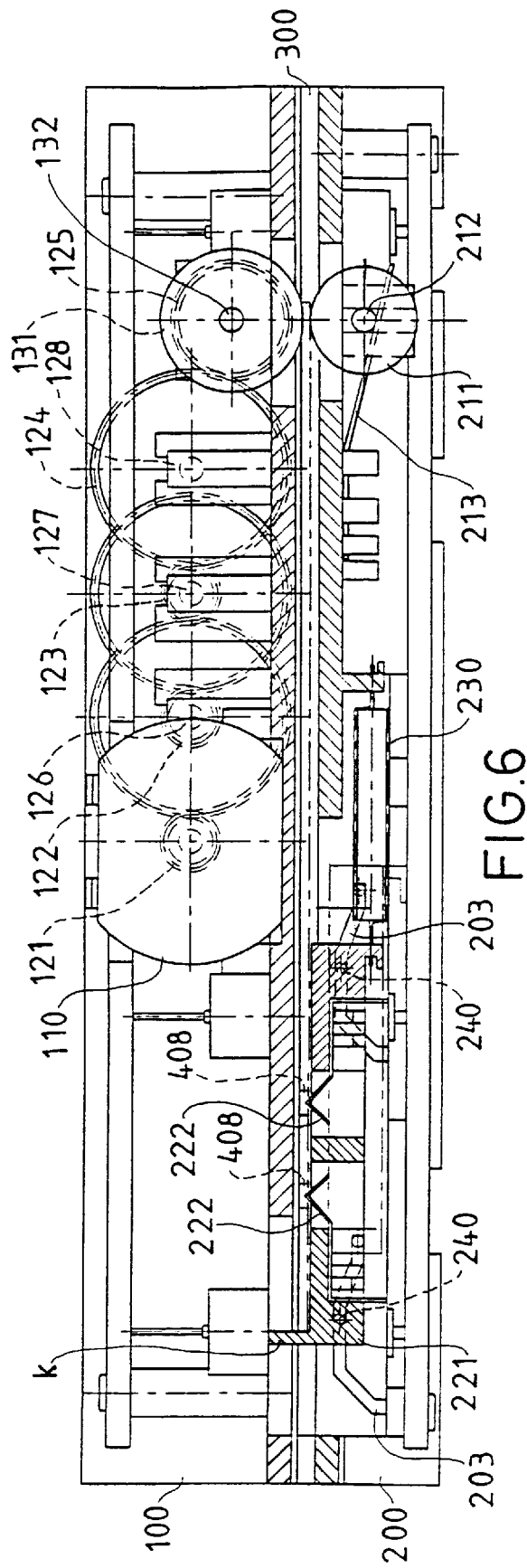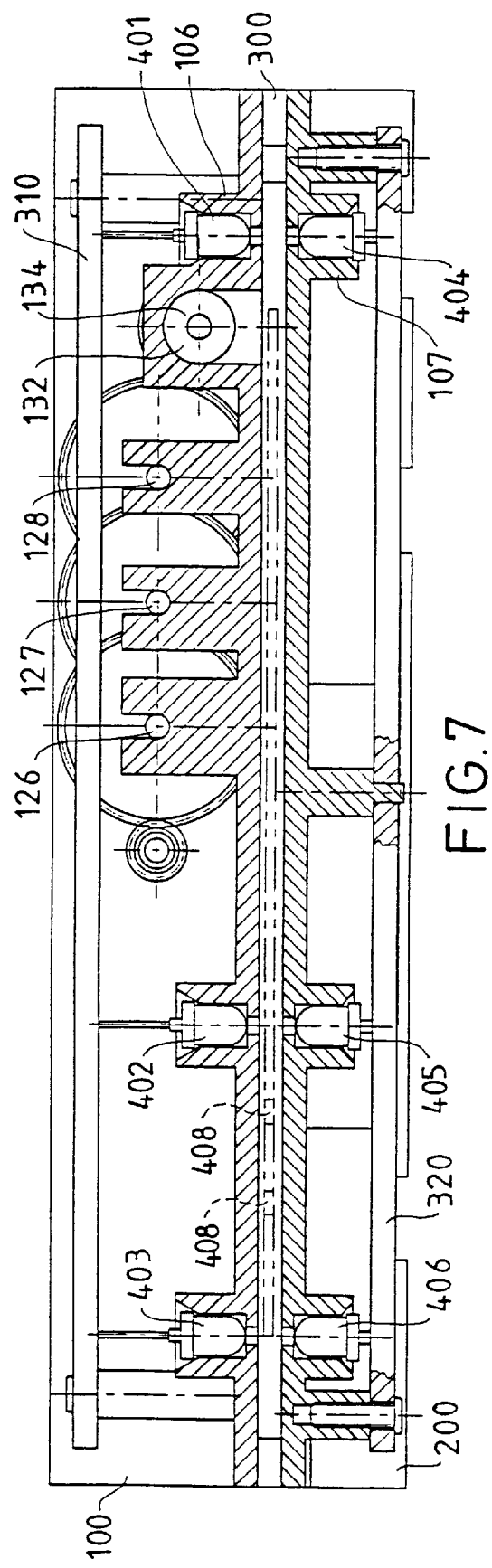

HYBRID CARD READERS FOR IC CARDS/MAGNETIC CARDS

FIELD OF THE INVENTION

The present invention relates to a hybrid card reader for (tegrated circuit) cards/magnetic cards and, more particularly, to a hybrid card reader for reading writing ISO (International Organization for Standardization) 7816 IC cards and ISO 7811 magnetic cards.

BACKGROUND OF THE INVENTION

Nowadays, a great number of IC cards are used as bank cards, credit cards, door access cards, parking lot access cards and the like. IC card readers are used to readiwrite data from/into the IC memory element of the IC card. U.S. Pat. No. 4,871,905 issued on Oct. 3, 1989 to Mita et al. discloses an IC card reader/writer which includes an upper conveying belt and a lower conveying belt for conveying the IC card sandwiched therebetween, in which the upper and lower conveying belts are arranged so as to deviate their positions from each other in the card conveying direction in order to form spaces to dispose the connector at both end edge portions of the upper and lower conveying belts. Such a card reader/writer may read cards of BULL format, USA format, JPN format, etc.

U.S. Pat. No. 5,036,184 issued on Jul. 30, 1991 to Sasaki discloses a card reader using linear card conveyer means, wherein a first embodiment disclosed therein includes a solenoid energized to grip the card between a moveable clamp member and a fixed clamp member, and a threaded rod is rotated to convey the card, and a second embodiment disclosed therein includes a linear motor to convey the card, while an inter lock is formed for preventing the carriage to be conveyed into the casing before properly securing the IC card to the carriage.

U.S. Pat. No. 5,463,678 issued on Oct. 31, 1995 to Kepley, III et al. discloses a card reader having a transducer head supported at one end of a guide path by a spring-loaded, pivoting arm. The spring is located adjacent the head and urges the head against the card as it passes under the head. The pivoted arm forces the head to follow a slightly accurate path as it moves in a direction transverse to the card.

U.S. Pat. No. 5,270,523 issued on Dec. 14, 1993 to Chang et al. discloses a plate spring for mounting a magnetic stripe card Teader's magnetic head, wherein the plate spring is made from a thin metal sheet having two opposite fixing wings such that the magnetic head is secured to the plate spring through a line contact and can be automatically rotated to the best reading position by a magnetic strip card to be read.

U.S. Pat. No. 5,191,198 issued on Mar. 2, 1993 to Do discloses a card reader for reading data recorded on a magnetic strip on a card, wherein the card reader includes a guide for guiding the card along a path past a transducer head. A gimbal arrangement mounts the head on the end of a mounting shaft which is journaled in the end of an arm for free rotation about an axis parallel to the strip as it moves along the path. By virtue of the free rotation of the head about an axis parallel to the stripe, the device adjusts for any lack of parallelism between the head and the magnetic stripe.

Nevertheless, as the rollers of the card readers disclosed in the above patents have complicated arrangements and occupy considerable spaces, the card reader have increased thickness and thus are not suitable for limited spaces (e.g., network electrical trade) or portable application (e.g., portable ID card reader for policemen). Further, the elements are FS complicated and difficult to manufacture and thus have a high cost. Further, if no uninterrupted power system is provided, the card cannot be quickly removed if interruption of service occurs or the card reader malfunctions.

Therefore, there has been a long and unfulfilled need for an improved card reader which mitigates and/or obviates the above problems.

SUMMARY OF THE INVENTION

It is an object of the present invention to provide a hybrid card reader for IC cards/magnetic cards which uses a motor automatic driving design such that the user may just insert a front end of the card into an opening of the card reader, and the card reader, after completing reading/writing data from/into the chips of the IC or magnetic stripe, automatically sends out the card. When an interruption of service occurs or the card reader malfunctions, the card can be quickly removed from the card reader and returned to the owner under manual operation.

A hybrid card reader for IC cards/magnetic cards in accordance with the present invention comprises a casing including an upper casing and a lower casing defining a card passage therebetween. A reduction gear train is mounted on the upper casing and driven by a motor mounted in the casing. A roller is rotatably mounted to the upper casing and driven by the reduction gear train. Two parallel walls are mounted on the lower casing and include aligned slots defined therein. An idle wheel shaft is mounted to the lower casing, and an idle wheel is rotatably mounted to the idle wheel shaft and faces the roller to sandwich a card inserted into the casing via the card passage between the idle wheel and the roller. A spring wire is securely mounted on the lower casing for retaining the idle wheel shaft in position. A fixing member is swivelably mounted to the casing for supporting a magnetic head. A frame is slidably guided by the slots of the parallel walls for contacting with an IC on the card.

The idle wheel contacts with the roller under the action of the spring wire when the card is not inserted into the card passage. When the card is inserted into the card passage, the card is sandwiched between the idle wheel and the roller and conveyed under rolling friction upon rotation of the roller.

The reduction gear train may be replaced by a belt. The reduction gear train includes an output end which is dislocated toward the direction of the card passage. In a preferred embodiment of the invention, the reduction gear train includes a first gear secured to an output shaft of the DC motor to rotate therewith, a first dual gear having an upper gear part meshed with the first gear and a lower gear part, a second dual gear having an upper gear part meshed with the lower gear part of the first dual gear and a lower gear part, a second gear meshed with the lower gear part of the second dual gear, and a third gear securely mounted on the roller shaft to rotate therewith. The first dual gear is rotatably mounted on a first gear shaft, the second dual gear is rotatably mounted on a second gear shaft, and the second gear is rotatably mounted on a third gear shaft, and the first gear shaft, the second gear shaft and the third gear shaft are securely mounted on the upper casing.

The idler wheel is biased toward the roller. More specifically, the spring wire biases the idle wheel toward the roller to sandwich the card.

The card frame includes a stop for contacting with the card which is completely inserted into the casing. A spring is provided for returning the card to reengage with the roller after the card has been engaged with the stop of the frame and disengaged from the roller. This arrangement prevents the card from being stuck in the card reader after it has been conveyed into the casing by the roller.

The frame includes a stop, and the card is conveyed forwardly by the roller to engage with the stop of the frame to thereby carry the frame forwardly under the guidance of the slots. Preferably, each of the slots of the parallel walls includes a slanted section to guide the frame downwardly so as to engage with IC contact points on the card.

In the preferred embodiment of the invention, the card reader further includes a first pair of photo sensors for detecting whether a card is inserted, a second pair of photo sensors for detecting whether a card is in the card reader for reading/writing purpose, and a third pair of photo sensors for detecting if a card reaches the read/write position Each of the upper casing and the lower casing includes a printed circuited board mounted thereon to which the photo sensors are securely mounted. Preferably, each of the upper casing and the lower casing includes three conic guiding grooves to position the photo-sensors.

The casing includes an opening, and further comprises a remover insertable into the casing via the opening to engage with and thus drive the output shaft of the motor for removing the card under manual operation when an interruption of service occurs or the card reader malfunctions.

Other objects, advantages, and novel features of the invention will become more apparent from the following detailed description when taken in conjunction with the accompanying drawings.

BRIEF DESCRIPTION OF THE DRAWINGS

FIG. 6 is a sectional view taken along line 6—6 in FIG. 2;

FIG. 7 is sectional view taken along line 7—7 in FIG. 2; and

DESCRIPTION OF THE PREFERRED EMBODIMENT

Figure 1:
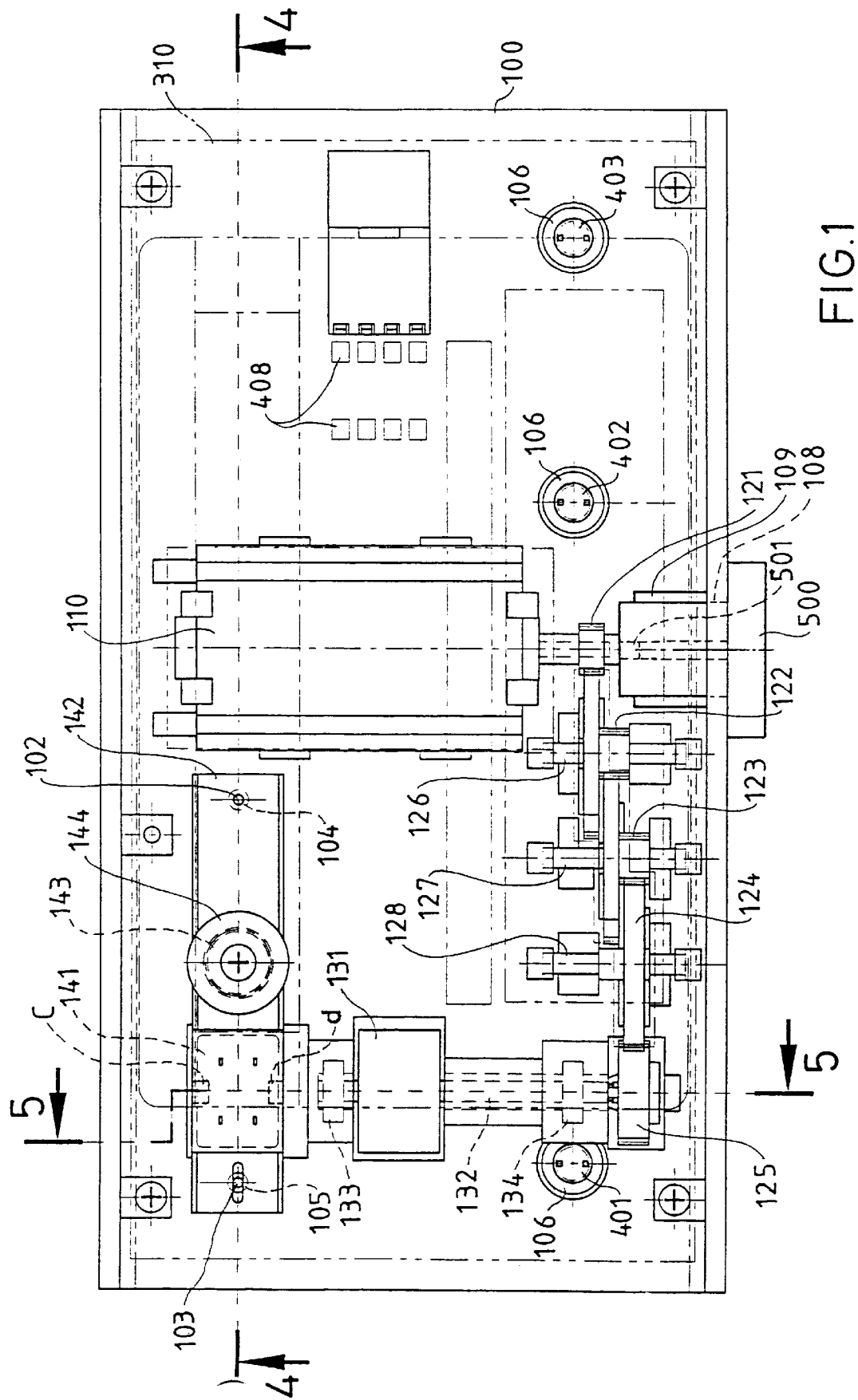
FIG. 1 is a top view of a hybrid card reader for IC cards/magnetic cards in accordance with the present invention.
Figure 2:
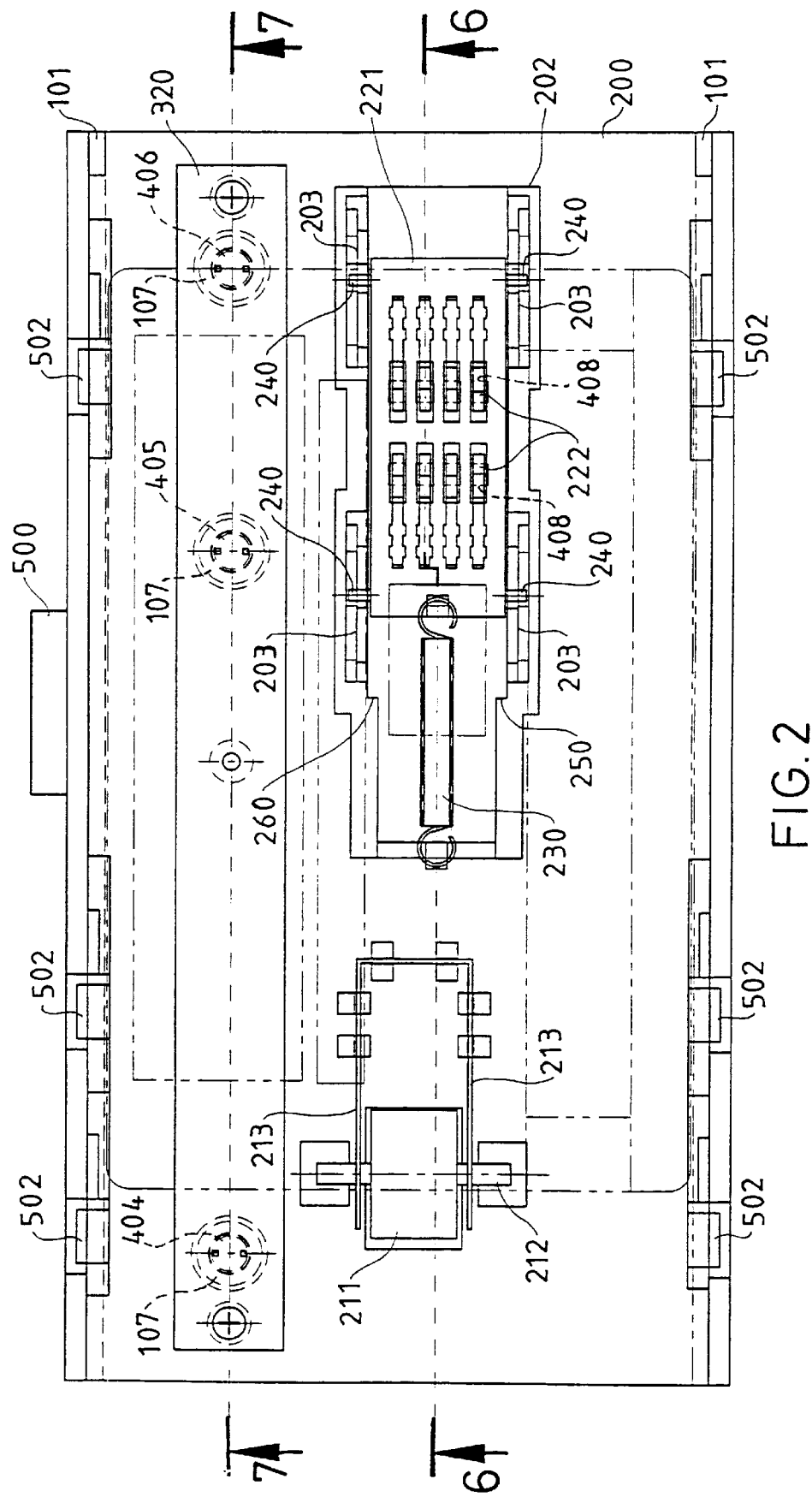
FIG. 2 is a bottom view of the hybrid card reader in accordance with the present invention.

Referring to the drawings and initially to FIGS. 1 and 2, a hybrid card reader for IC cards/magnetic cards in accordance with the present invention includes an upper casing 100 and a lower casing 200 securely connected to the upper casing 100 by means of fastening members 502 on the upper casing 100. The lower casing 200 bears against and is thus positioned by protrusions 101 (FIG. 2) formed on the upper casing 100. The card reader formed by means of assembling the upper and lower casings 100 and 200 includes a card passage 300 (FIG. 4) defined in an end thereof through which an IC card is passable.

Still referring to FIG. 1, a DC motor 110 and a reduction gear train are mounted on the upper casing 100. The reduction gear train includes a first gear 121 secured to an output shaft (not labeled) of the DC motor 110 to rotate therewith, a first dual gear 122 having an upper gear part (the upper one in FIG. 1) meshed with the first gear 121 and a lower gear part (the lower one in FIG. 1), a second dual gear 123 having an upper gear part (the upper one in FIG. 1) meshed with the lower gear part of the first dual gear 122 and a lower gear part (the lower one in FIG. 1), a second gear 124 meshed with the lower gear part of the second dual gear 123, and a third gear 125. The first dual gear 122 is rotatably mounted on a first gear shaft 126, the second dual gear 123 is rotatably mounted on a second gear shaft 127, and the second gear 124 is rotatably mounted on a third gear shaft 128. The gear shafts 126, 127, and 128 are securely mounted on the upper casing 100. The third gear 125 is securely mounted on a roller shaft 132 to rotate therewith. The reduction gear train is provided to obtain the required torque and to lower the speed for conveying the IC card so as to provide a proper reading/writing speed for the magnetic stripe. Some of the gears in the reduction gear train may be replaced by a belt.

The roller shaft 132 is rotatably supported by bearings 133 and 134, while a roller 131 is securely mounted on the roller shaft 132 to rotate therewith. In assembly, the roller assembly (including the roller 131, the roller shaft 132, the third gear 125, and the bearings 133 and 134) is inserted into the upper casing 100 via the card passage 300, and the bearings 133 and 134 are fixed to the upper casing 100 by, e.g., glue. The roller assembly so mounted is advantageous in that the bearing seat provides a closed end wall to be subjected to forces. This increases the supporting capacity of the bearings 133 and 134, thereby avoiding detachment of the roller assembly.

Refer to FIG. 2 which illustrates a bottom view of the card reader. An idle wheel 211 is rotatably mounted on an idle wheel shaft 212 (which is rotatably mounted to the lower casing is 200) and faces the roller 131. The idle wheel 211 is biased by a spring wire 213 to bear against the inserted card such that the idle wheel 211 and the roller 131 sandwich the inserted card and convey the inserted card forward into the card reader or rearward away from the card reader upon rotation of the roller 131. Both ends of the idle wheel 212 are retained by two distal ends of the substantially U-shaped spring wire 213 which face the card passage 300, while the U-section of the spring wire 213 is securely received in grooves (not labeled) defined in the lower casing 200. As only one roller 131 is used, the card does not move after it has been disengaged from the roller 131. The is advantageous in that when the motor cannot be stopped (e.g., the switch for turning off the motor malfunctions), the card is prevented from keeping running and thus being damaged after it has disengaged from the roller 131.

Still referring to FIG. 2, two parallel walls 202 are integrally formed on an inner side of the lower casing 200. The walls 202 include two pairs of aligned slots 203 defined therein. Each slot 203, as shown in FIG. 6, includes a slanted section. A frame 221 includes four sliding pegs 240 which are respectively, slidably received in the slots 203 in the walls 202 to allow sliding movement of the frame 221 relative to between the walls 202. The frame 221 includes a stop "k" (FIG. 6) provided to an end of an underside thereof. When the card contacts with the stop "k", the roller 131 conveys the card further forward by means of rolling friction to cause the frame 221 to also move forward. The frame 221 also moves downwardly during its forward travel as being guided by the slanted sections of the slots 203. Provided on the frame 221 are eight metallic resilient contact plates 222 which contact with eight contact points 408 on the IC card when the frame 221 is moved downwardly to proceed with read/write procedure. A spring 230 (preferably an extension spring, see FIGS. 2 and 6) is attached to the frame 221 to return the frame 221 back to its initial position when the card is to be moved rearward for removal. The frame 221 is stopped by two blocks 250 and 260 Rig. 2) during its rearward travel. Frictional engagement between the resilient contact plates 222 on the frame 211 and the card is prevented when the contact plates 222 contact with the contact points 408 on the IC card to thereby avoid damage to the IC card.

It is appreciated that, after the card has been completely moved into the card reader for possible reading/writing procedure and contacted with the stop "K", the extension spring 230 may return the card back to reengage with the roller 131 for sending off the card if no further procedure is to be proceeded with. It is further appreciated that the use of the single roller 131 avoids the roller to pass through protruded area and magnetic stripe section on the card, thereby providing a stable movement for the card without adversely affecting reading/writing procedure.

Figure 3:
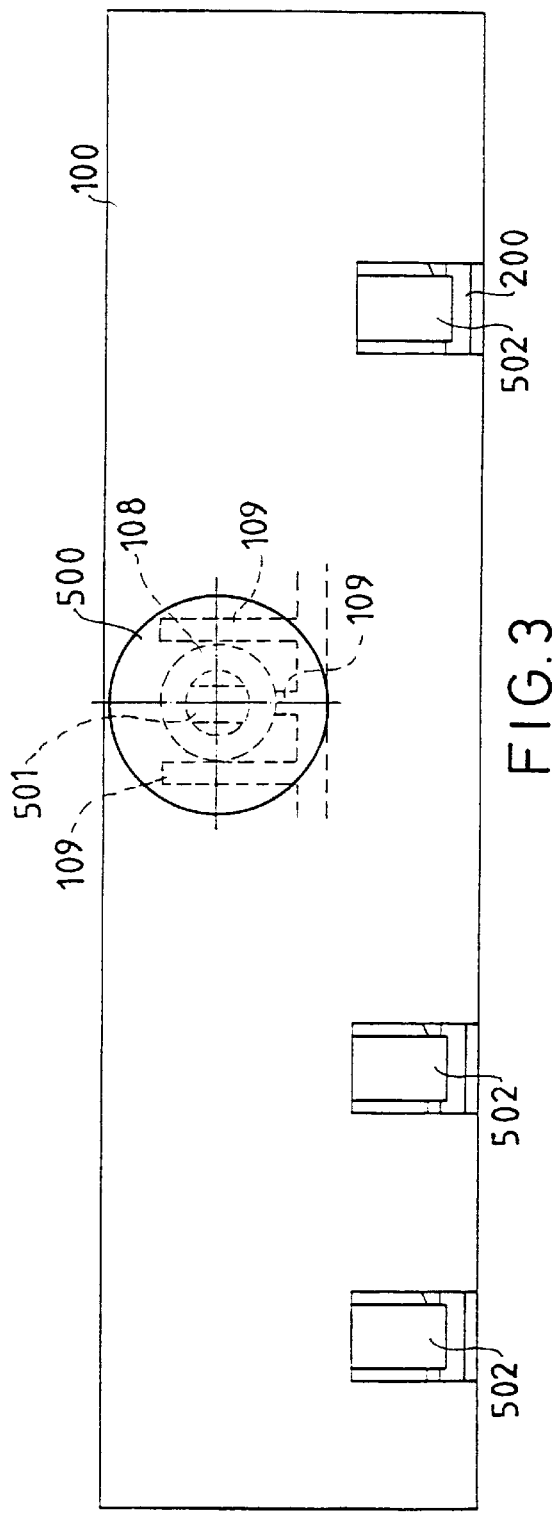
FIG. 3 is a side view of the hybrid card reader in accordance with the present invention.

Referring to FIGS. 1 and 3, when an interruption of service occurs or the card reader malfunctions, the card can be removed from the card reader without disassembling the card reader. It is achieved by plugging a remover 500 into the upper casing 100 via an opening 108 defined in a side of the upper casing 100 under the guidance of three blocks 109 provided on the upper casing 100, wherein the remover 500 includes a keyway 501 to securely receive a distal end of the first gear 121, which has a key shape corresponding to the keyway 501. Rotation of the remover 500 causes rotation of the first gear 121 and thus drives the roller 131 via transmission of the reduction gear train for removing the card.

Figure 4:
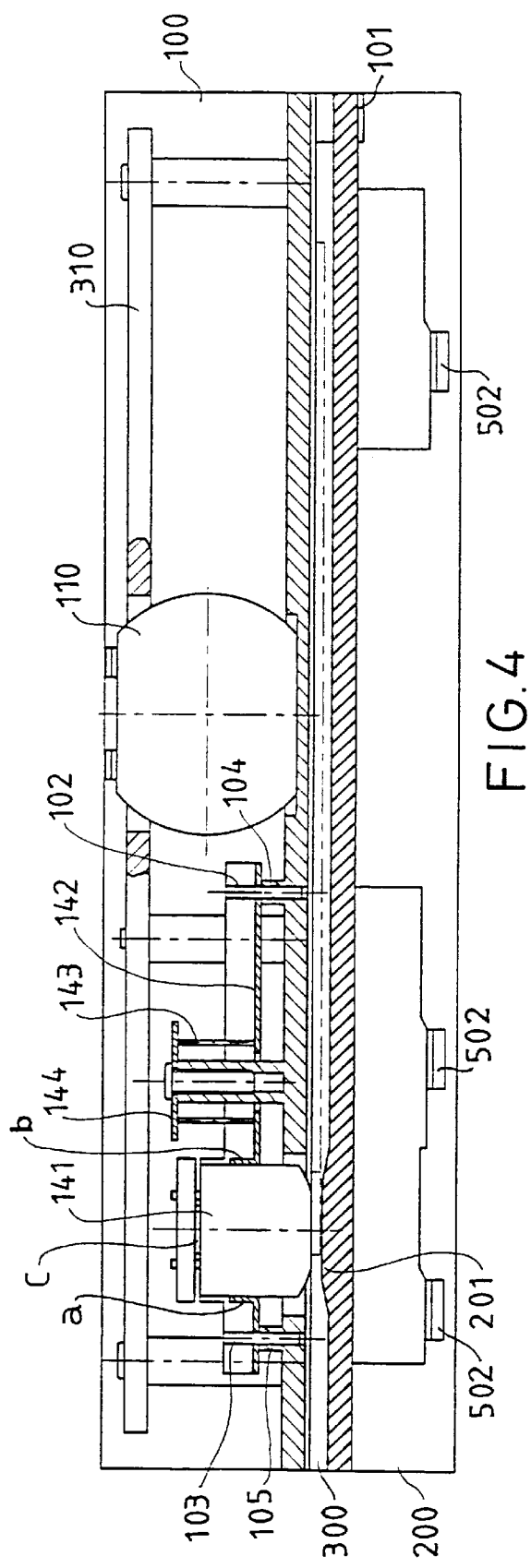
FIG. 4 is a sectional view taken along line 4—4 in FIG. 1.
Figure 5:
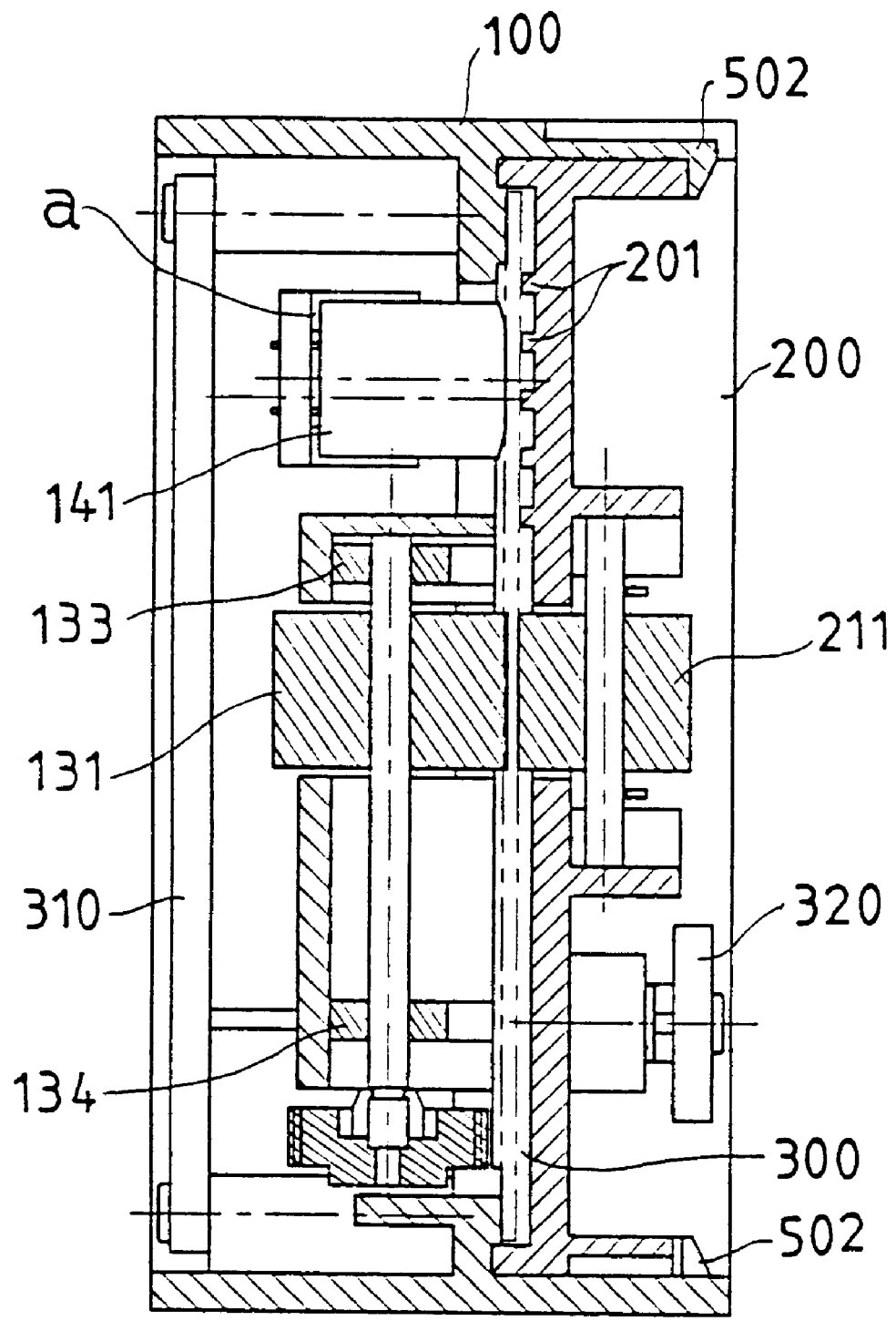
FIG. 5 is a sectional view taken along line 5—5 in FIG. 1.

Referring to FIG. 4, a fixing member 142 is mounted to the upper casing 100 and includes protrusions "a", "b" for securing the magnetic head 141 in position. In assembly, the magnetic head 141 is inserted into an opening of the flying member 142 and guided by the protrusions "a" and "b" and two lateral steel walls of the fixing member 142. The magnetic head 141 reaches its position when its rear side contacts with protrusions "c" and "d". After the magnetic head 141 is positioned in the fixing member 142, a printed circuit board 310 is provided and soldered to a signal output end of the magnetic head 141 to thereby secure the magnetic head 141 to the fixing member 142. In brief the fixing member 142 can be positioned by means of provision of the protrusions, engagement between the printed circuit board 310 and the protrusions as well as soldering between the printed circuit board 310 and the signal output end of the magnetic head 141. Further, glue or soldering can be used to enhance the fixture of the magnetic head 141. As shown in FIG. 4, the fixing member 142 includes a compression spring 143 mounted thereto by a cap 144 and a screw (not labeled) to bias the magnetic head 141 toward the lower casing 100.

Still referring to FIG. 4, movement of the fixing member 142 is restrained by two pins 102 and 103 provided on the upper casing 100. Further, the magnetic head 142 is supported by two posts 104 and 105 on the upper casing 100. The diameters of the posts 104 and 105 are smaller than a width of the fixing member 142 such that when the card is inserted into the card reader, the magnetic head 141 may swivel about the posts 104 and 105 under the action of the spring 143 to have a close contact with the magnetic stripe on the card to thereby assure accuracy in reading/writing. A protrusion 201 is formed on the lower casing 200 and faces the magnetic head 141 to provide an upward support for the magnetic head 141 which further assures the close contact between the card and the magnetic head 141. Referring to FIG. 7, the card reader further includes a first pair of photo sensors 401 and 404, a second pair of photo-sensors 402 and 405, and a third pair of photo-sensors 403 and 406. In each pair of photo sensors 401, 402, 403, 404, 405, and 406, one of the sensors emits light while the other receives the light. The sensors 401, 402, and 403 are mounted on the upper casing 100 while the sensors 404, 405, and 406 are mounted to the lower casing 200 respectively located corresponding to positions of the sensors 401, 402, and 403. The sensors 401, 402, and 403 are securely mounted on the upper casing 100 while three conic guiding grooves 106 (FIGS. 1 and 7) are defined in the upper casing 100 to allow easy installation of the sensors. Similarly, the sensors 404, 405, and 406 are securely mounted to a printed circuit board 320 provided on the lower casing 200 and positioned in three conic guiding grooves 107 defined in the lower casing 200. The turning on sequence among the three pairs of sensors 401, 402, 403, 404, 405, and 406 is the first pair of sensors 401 and 404, then the second pair of sensors 402 and 405, and then the third pair of sensors 403 and 406, while the turning off sequence among the three pairs of sensors 401, 402, 403, 404, 405, and 406 is the third pair of sensors 403 and 406, then the second pair of sensors 402 and 405, and then the first pair of sensors 401 and 404. The main flnction of the first pair of sensors 401 and 404 is to detect whether a card is inserted, the main flnction of the third pair of sensors 403 and 406 is to assure the card reaches the read/write position, and the main function of the second pair of sensors 402 and 405 is to detect whether a card is in the card reader for reading/writing purpose as the distance between the first pair of sensors 401 and 404 and the third pair of sensors 403 and 406 is relatively long.

Figure 8:
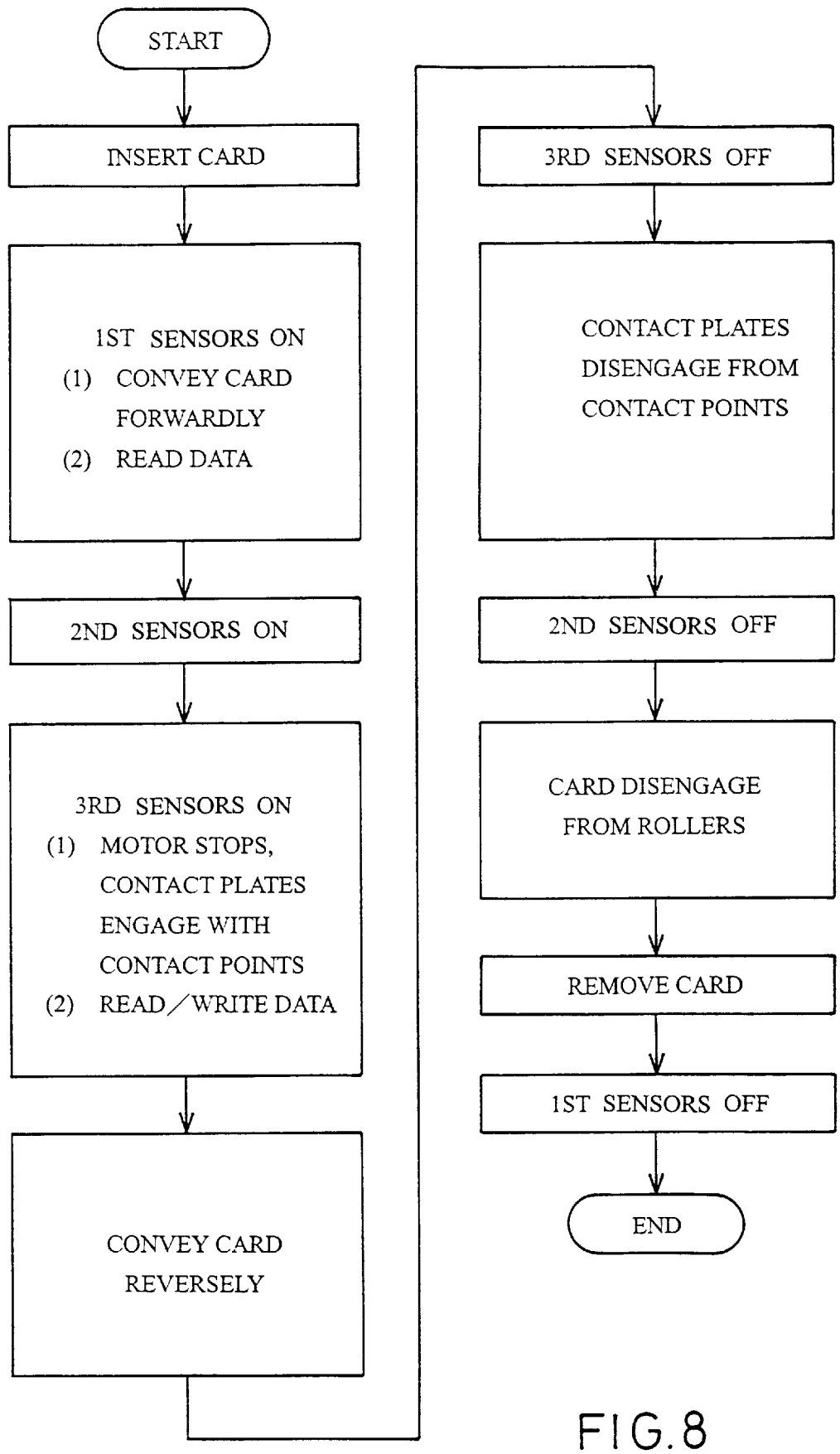
FIG. 8 is a flowchart illustrating operation of the hybrid card reader in accordance with the present invention.

Refer now to FIG. 8 which illustrates a flowchart of operation of the card reader of the present invention. First, the card is partially inserted by its owner into the card reader (S10). The first pair of sensors 401 and 404 turns on, the motor 110 turns to convey the card forwardly into the card reader, and the magnetic head 141 reads data recorded on the magnetic stripe on the card (S12). The second pair of sensors 402 and 405 is turned on (S14) as the card is in the card reader. Then, the third pair of sensors 403 and 406 turns on, the motor 110 stops, and the contact plates 222 engage with the contact points 408 to proceed with reading/writing of data from/into the IC (S16). After completion of the reading/writing procedure, the motor 110 turns in a reverse direction to convey the card reversely (S18). The third pair of switches 403 and 406 turns off (S20). Then, the contact plates 222 disengage from the contact points 408 on the IC (S22). The second pair of sensors 402 and 405 turns off (S24). The card disengages from the roller 131, and most part of the card is outside the card reader (S26) to allow the user to remove the card (S28). Finally, the first pair of sensors 401 and 404 turns off (S30).

In order to minimize the diameter of the rollers 131, the output gear, i.e., the third gear 125 is dislocated in a direction toward the card passage 300 (i.e., the third gear 125 is not in alignment with the card passage 300) such that the roller 131 on the roller shaft 132 (to which the third gear 125 is mounted) may contact with the card. The roller 131 has a diameter so sized that the thickness and height of the card reader are minimized while the linear speed for conveying the card is proper for the magnetic head to read/write.

It is appreciated that all of the elements are mounted to two lateral walls respectively of the upper and lower frames 100 and 200 such that the overall width of the card reader of the present invention is approximately the width of the card (about 54 mm) plus the thicknesses of the two lateral walls. The width of the card reader of the present invention is reduced to 62 mm or smaller, while the height of the card reader is reduced to 30 mm or smaller. Thus, a compact, light, portable card reader is provided.

According to the above description, it is appreciated that the hybrid card reader for IC cards/magnetic cards of the present invention can be used as bank cards, credit cards, door access cards, parking lot access cards, member cards and the like. Further, the hybrid card reader of the present invention is suitable for limited space as having a compact design.

Although the invention has been explained in relation to its preferred embodiment, it is to be understood that many other possible modifications and variations can be made without departing from the spirit and scope of the invention as hereinafter claimed.

What is claimed is:

1. A hybrid card reader for IC cards/magnetic cards, comprising:
    a casing including an upper casing and a lower casing defining a card passage therebetween,
    a motor mounted in the casing,
    a reduction gear train mounted on the upper casing and driven by the motor,
    a roller rotatably mounted to the upper casing and driven by the reduction gear train,
    two parallel walls mounted on the lower casing and including aligned slots defined therein,
    an idle wheel rotatably mounted to an idle wheel shaft and facing the roller to sandwich a card inserted into the casing via the card passage between the idle wheel and the roller,
    a spring wire securely mounted on the lower casing for retaining the idle wheel shaft in position,
    a fixing member swivelably mounted to the casing for supporting a magnetic head, and
    a frame slidably guided by the slots of the parallel walls for contacting with an IC on the card,
      whereby the idle wheel contacts with the roller under the action of the spring wire when the card is not inserted into the card passage, and when the card is inserted into the card passage, the card is sandwiched between the idle wheel and the roller and conveyed under rolling friction upon rotation of the roller.

2. The hybrid card reader for IC cards/magnetic cards as defined in claim 1, wherein the reduction gear train may be replaced by a belt.

3. The hybrid card reader for IC cards/magnetic cards as defined in claim 1, wherein the idler wheel is biased toward the roller.

4. The hybrid card reader for IC cards/magnetic cards as defined in claim 1, wherein the spring wire biases the idle wheel toward the roller to sandwich the card.

5. The hybrid card reader for IC cards/magnetic cards as defined in claim 1, wherein the frame includes a stop for contacting with the card which is completely inserted into the casing, and further comprises a spring for retnming the card to re-engage with the roller after the card has been engaged with the stop of the frame and disengaged from the roller.

6. The hybrid card reader for IC cards/magnetic cards as defined in claim 1, wherein the frame includes a stop, and the card is conveyed forwardly by the roller to engage with the stop of the frame to thereby carry the frame forwardly under the guidance of the slots.

7. The hybrid card reader for IC cards/magnetic cards as defined in claim 6, wherein each of the slots of the parallel walls includes a slanted section to guide the frame downwardly so as to be adapted to engage with IC contact points on the card.

8. The hybrid card reader for IC cards/magnetic cards as defined in claim 1, wherein the card reader further includes a first pair of photo sensors for detecting whether a card is inserted, a second pair of photo sensors for detecting whether a card is in the card reader for reading/writing purpose, and a third pair of photo sensors for detecting if a card reaches the read/write position.

9. The hybrid card reader for IC cards/magnetic cards as defined in claim 8, wherein each of the upper casing and the lower casing includes a printed circuited board mounted thereon to which the photo sensors are securely mounted.

10. The hybrid card reader for IC cards/magnetic cards as defined in claim 9, wherein each of the upper casing and the lower casing includes three conic guiding grooves to position the photo sensors.

11. The hybrid card reader for IC cards/magnetic cards as defined in claim 1, wherein the reduction gear train includes a first gear secured to an output shaft of the DC motor to rotate therewith, a first dual gear having an upper gear part meshed with the ftrst gear and a lower gear part, a second dual gear having an upper gear part meshed with the lower gear part of the first dual gear and a lower gear part, a second gear meshed with the lower gear part of the second dual gear, and a third gear securely mounted on the roller shaft to rotate therewith, therein the first dual gear is rotatably mounted on a first gear shaft, the second dual gear is rotatably mounted on a second gear shaft, and the second gear is rotatably mounted on a third gear shaft, the first gear shaft, the second gear shaft and the third gear shaft are securely mounted on the upper casing.

12. The hybrid card reader for IC cards/magnetic cards as defined in claim 1, wherein the reduction gear train includes an output end which is dislocated in direction of the card passage.

13. The hybrid card reader for IC cards/magnetic cards as defined in claim 1, wherein the casing includes an opening, and further comprises a remover insertable into the casing via the opening to engage with and thus drive an output shaft of the motor for removing the card when an interruption of service occurs or the card reader malfunctions.

* * * * *